United States Patent
Mitarai et al.

[19]

[11] Patent Number: 5,945,769
[45] Date of Patent: *Aug. 31, 1999

[54] WAVE DRIVEN MOTOR

[75] Inventors: Reiji Mitarai, Hachioji; Hiroaki Takeishi, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/273,625

[22] Filed: Jul. 12, 1994

Related U.S. Application Data

[63] Continuation of application No. 07/933,722, Aug. 24, 1992, abandoned.

[30] Foreign Application Priority Data

Aug. 26, 1991 [JP] Japan ................................ 3-213637

[51] Int. Cl.$^6$ .................................................... H02N 2/00
[52] U.S. Cl. ............................................ 310/317; 310/323
[58] Field of Search .................................. 310/316, 317, 310/323, 328; 318/116

[56] References Cited

U.S. PATENT DOCUMENTS

| | | | |
|---|---|---|---|
| 4,484,099 | 11/1984 | Kawai et al. ............................ | 310/317 |
| 4,504,760 | 3/1985 | Yamamoto et al. ..................... | 310/323 |
| 4,513,219 | 4/1985 | Katsuma et al. ........................ | 310/328 |
| 4,645,964 | 2/1987 | Hiramatsu et al. ..................... | 310/323 |
| 4,649,311 | 3/1987 | Mukohjima et al. ................... | 310/323 |
| 4,678,956 | 7/1987 | Izukawa et al. ........................ | 310/323 |
| 4,697,117 | 9/1987 | Mishiro .................................. | 310/323 |
| 4,705,980 | 11/1987 | Mishiro .................................. | 310/323 |
| 5,126,614 | 6/1992 | Fujita et al. ............................ | 310/323 |
| 5,198,714 | 3/1993 | Salomon et al. ........................ | 310/323 |
| 5,237,237 | 8/1993 | Ueda et al. ............................. | 310/323 |
| 5,247,220 | 9/1993 | Miyazawa et al. ..................... | 310/323 |
| 5,256,928 | 10/1993 | Nishikura et al. ...................... | 310/323 |
| 5,336,958 | 8/1994 | Saya et al. .............................. | 310/316 |
| 5,610,468 | 3/1997 | Miyazawa et al. ..................... | 310/323 |

FOREIGN PATENT DOCUMENTS

| | | |
|---|---|---|
| 0424139 | 4/1991 | European Pat. Off. ........ H01L 41/09 |
| 0495665 | 7/1992 | European Pat. Off. . |
| 3924 | 1/1991 | Japan ............................... H02N 2/00 |
| 70882 | 4/1991 | Japan ............................... H02N 2/00 |
| 101260 | 5/1991 | Japan ............................... H02N 1/00 |

OTHER PUBLICATIONS

European Search Report dated Jun. 22, 1995.
"Introduction to Ultrasonic Motors", Songo Denshi Shuppan (1991).
European Search Report.

*Primary Examiner*—Thomas M. Dougherty
*Attorney, Agent, or Firm*—Fitzpatrick, Cella, Harper & Scinto

[57] ABSTRACT

A vibration driven motor including a plurality of polarized piezo-electric elements disposed on a vibrator, in which cyclic signals different in phase selectively are applied to the respective elements to form standing waves to drive a moved body. A direction of polarization of each of the piezo-electric elements in the motor is identical. A plurality of consecutive elements are grouped, and cyclic signals of predetermined phase selectively are applied to predetermined element groups.

8 Claims, 4 Drawing Sheets

WAVE DRIVEN MOTOR

This application is a continuation of application Ser. No. 07/933,722 filed Aug. 24, 1992 now abandoned.

BACKGROUND OF THE INVENTION

1. Field of the Invention

The present invention relates to an ultrasonic motor (wave driven motor), in which travelling waves are generated in an elastic body to convert wave energy thereof into a thrust or into a torque. More particularly, the invention relates to a travelling wave type motor having a long life with little reduction in performance by an arrangement to make generation of standing waves spatially changeable, which are sources of travelling waves.

2. Related Background Art

Figure 2:
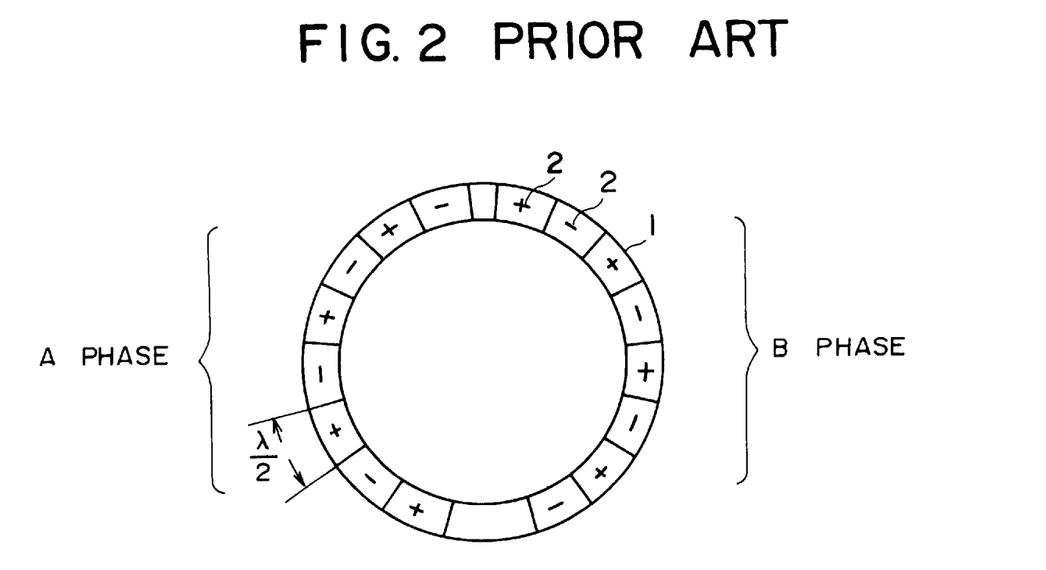
FIG. 2 is a drawing to show a state of polarization in a conventional motor.

A typical example of conventional travelling wave type ultrasonic motors is an annular motor as described in "Introduction to Ultrasonic Motors" (Sougo Denshi Shuppan, 1991). The annular motor is structured as follows. A vibrator is formed such that piezo-electric elements, which are electro-mechanical energy conversion elements, are adhered to a back face of an annular elastic body to form travelling waves on a surface of the elastic body. A moved body pressure-contacts a travelling wave forming plane of the vibrator to be friction-driven by the travelling waves. There is a proposal of such a reverse arrangement with necessity that the moved body is fixed and the vibrator moves. FIG. 2 is a drawing to show an arrangement of piezo-electric elements in the vibrator of the annular motor. There are provided two phases of electrode groups for drive, which will be hereinafter referred to as A phase and B phase with a spatial phase difference of 90 degrees in the vibrator on the right side and on the left side in FIG. 2. In each of the A and B phases, the piezo-electric element plates having alternating polarity, as shown. A pair of positive and negative piezo-electric plates in each phase correspond to one wave length. Respective voltages different in time phase by 90 degrees are applied to the A and B phases. A travelling wave is generated as a result of synthesis of a standing wave generated by the A phase with a standing wave generated by the B phase.

In the above-described conventional technique, a standing wave for each of the phases is generated at a constant or fixed position of the vibrator. Therefore, if the two phases have respective standing waves with a spatial phase difference and a time phase difference both of 90 degrees and with an equal amplitude, an ideal travelling wave would be formed. It is, however, difficult to satisfy such ideal conditions actually.

If the conditions for generating a travelling wave are incomplete, then a wave thus generated is a superposition of a travelling wave having a main component, other travelling wave components different in frequency and standing wave components. The standing wave components are fixed relative to the arrangement of piezo-electric elements, so that the moved body is frequently hit at friction faces located at antinodes of the standing waves. Entended operation of the travelling wave type motor with such an arrangement thus results in abrasion at fixed positions of the vibrator, that is, at the locations of antinodes. This reduces a surface evenness of a working face causing a dispersion of flatness. Vibrations obtained from ordinary piezo-electric bodies and elastic bodies industrially used have amplitudes on an order of at most several microns. The dispersion of flatness on a working face causes unevenness of torque or of thrust, which is a main factor of decrease in performance of an actuator. This in turn results in a lowering of durability.

SUMMARY OF THE INVENTION

One aspect of the present invention is to provide a wave driven motor in which vibration application positions of standing waves may be arbitrarily changed, thus preventing localized friction on a working face, which might be the case in the above-noted conventional arrangement of vibration application positions that are permanently fixed, and arbitrarily setting a rotational torque or the like.

Another aspect of the present invention is to provide a motor employing a piezo-electric element arrangement whereby a plurality of piezo-electric element pieces employed for each half-wave length, instead of a single piezo-electric element for each half-wave length ($\lambda/2$) in the conventional arrangement, and in which the piezo-electric element pieces are electrically independent of each other so as to allow a change in position for forming a standing wave.

Another aspects of the present invention is to manipulate the spacial phase difference and to improve the controllability of the motor, which will be apparent from the preferred embodiment as described with reference to the accompanying drawings.

Other objects of the present invention will be apparent from the preferred embodiment as described with reference to the accompanying drawings.

BRIEF DESCRIPTION OF THE DRAWINGS

FIGS. 1A–1C are drawings of an arrangement to show an embodiment of a vibration-type motor according to the present invention, in which

DESCRIPTION OF THE PREFERRED EMBODIMENT

Figures 1A, 1B, 1C:
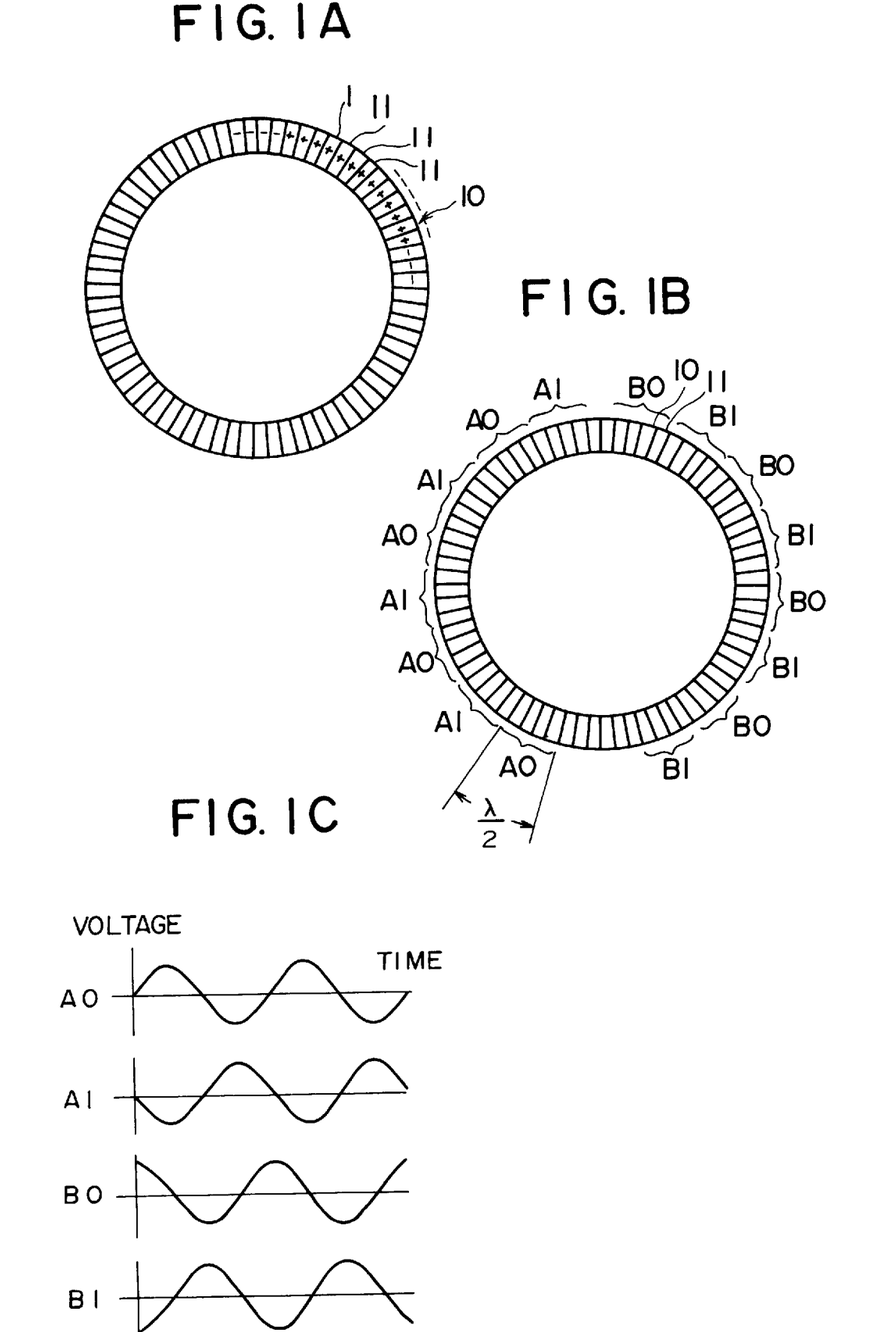
FIG. 1A shows a state of polarization of a vibrator.
FIG. 1B shows phases of drive signals.
FIG. 1C shows drive signals.

FIG. 1 shows a preferred embodiment of an ultrasonic motor (wave driven motor) according to the present invention.

An ultrasonic motor is applied to a rotational motor in the present embodiment. A vibration body is a ring-shaped stator (vibrator) 10. Piezo-electric element pieces 11 are positioned on the stator 10, covering the entire ring circumference. The piezo-electric element pieces 11 have the same direction of polarization and a small equal width. The piezo-electric element pieces 11 identical in polarization direction are set electrically independently of each other on the stator. For example, a flexible print substrate (not shown) is provided on surfaces of the piezo-electric element pieces 11 to selectively apply an arbitrary voltage to each of the piezo-electric element pieces 11.

There are seventy two piezo-electric element pieces disposed over the stator 10 at an equal pitch of central angle subtended at five degrees in the present embodiment. FIGS. 1B and 1C show a drive method to generate travelling waves equivalent to those in the conventional example as shown in FIG. 2.

In the present embodiment, four pieces of piezo-electric elements correspond to a half-wave length ($\lambda/2$). As shown in FIG. 1B, an A phase is composed of four sets of alternate A0 and A1 phases each of which includes four consecutive pieces of piezo-electric elements, corresponding to the A phase in FIG. 2. The A phase of the present embodiment occupies four wave lengths (4λ). Two piezo-electric element pieces are interposed between the A phase and a B phase. That is, there is a spacing of a quarter-wave length (λ/4) between the A phase and the B phase. The B phase includes four sets of alternate B0 and B1 phases each of which is composed of four consecutive piezo-electric element pieces.

A circuit to drive the piezo-electric element pieces in the A phase and in the B phase has a structure to manage an assignment of the piezo-electric element pieces to respective power sources using a multiplexer. Oscillations (driving wave forms) of the power sources are four phases of oscillating waves of sine wave, cosine wave, and inverted waves thereof as shown in FIG. 1C. For example, if the piezo-electric element pieces in the A0 phase radially expand, then the piezo-electric element pieces in the A1 phase radially contract, thereby forming a standing wave in the A phase with antinodes in the A1 phases.

Since the piezo-electric element pieces 11 are disposed at an equal pitch in the ring-shaped 10 vibrator, the combination of piezo-electric element groups each of which is composed of four consecutive pieces may be shifted, for example, by a single piezo-electric element piece, so as to shift the positions of antinodes of the standing wave by the width of a single piezo-electric element piece.

An automatic operation or a periodical manual operation may shift the assignment of each phase as a whole to change the generation position of the standing waves. A spatial phase difference may be controlled by increasing or decreasing a spacing between the A phase (A0 and A1 phases) and the B phase (B0 and B1 phases).

Figure 3:
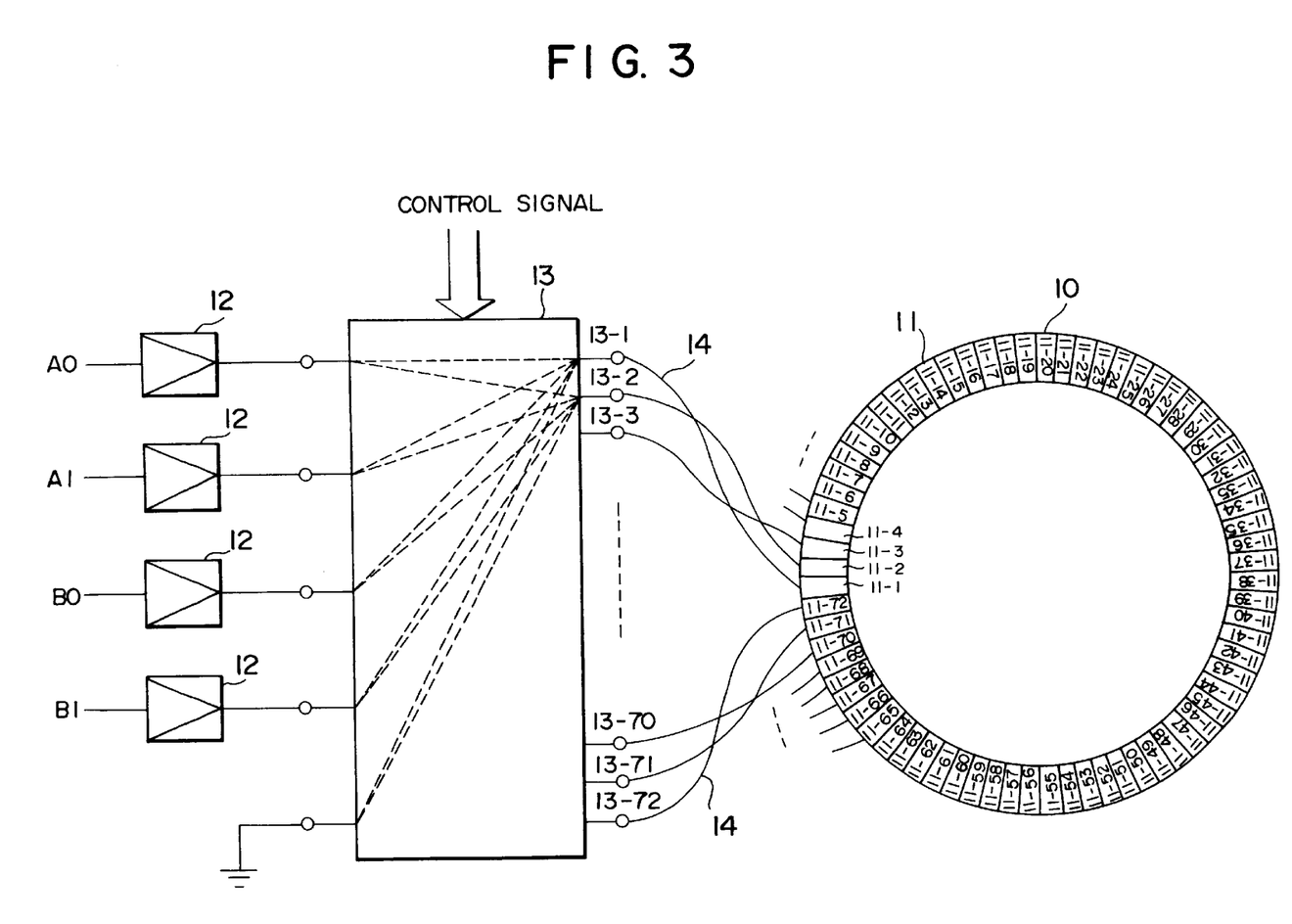
FIGS. 3 and 4 are circuit diagrams to show examples of a drive circuit of a the motor.

FIG. 3 is a circuit diagram of the drive circuit to automatically shift the assignment of A and B phases using a multiplexer.

In the drive circuit, the respective drive signals of A0 phase, of A1 phase, of B0 phase, and of B1 phase as shown in FIG. 1C are amplified by respective amplifiers 12, and amplified signals are output from the amplifiers 12 to the multiplexer 13. The multiplexer 13 has output terminals on its output side, corresponding to the entire piezo-electric element pieces 11 of the vibrator 10. For example, the respective output terminals are electrically connected to the piezo-electric element pieces through respective conductive wires 14 of flexible print substrate.

As described, the output terminals 13-1 to 13-72 of the multiplexer 13 are respectively independently connected to the piezo-electric element pieces 11-1 to 11-72 of the vibrator 10. The multiplexer 13 selectively outputs, in response to a control signal, drive signals of A0, A1, B0 and B1 phases, and a signal of ground level from arbitrary output terminals.

An example of the output is as follows: The output terminals (13-1 to 13-4), (13-9 to 13-12), (13-17 to 13-20), (13-25 to 13-28) output the drive signal of B0 phase; the output terminals (13-5 to 13-8), (13-13 to 13-16), (13-21 to 13-24), (13-29 to 13-32) output the drive signal of B1 phase; the output terminals (13-67 to 13-70), (13-59 to 13-62), (13-51 to 13-54), (13-43 to 13-46) output the drive signal of A1 phase; the output terminals (13-63 to 13-66), (13-55 to 13-58), (13-47 to 13-50), (13-39 to 13-42) output the drive signal of A0 phase; and the other terminals output the signal of ground level. Another example is a shift by a single piezo-electric element piece from the above state, as follows: the output terminals (13-2 to 13-5), (13-10 to 13-13), (13-18 to 13-21), (13-26 to 13-29) output the signal of B0 phase; the output terminals (13-6 to 13-9), (13-14 to 13-17), (13-22 to 13-25), (13-30 to 13-33) output the signal of B1 phase; the output terminals (13-68 to 13-71), (13-60 to 13-63), (13-52 to 13-55), (13-44 to 13-47) output the signal of A1 phase; the output terminals (13-64 to 13-67), (13-56 to 13-59), (13-48 to 13-51), (13-40 to 13-43) output the signal of A0 phase; and the other terminals output the signal of ground level.

Further, output the multiplexer 13 may effect an arbitrary shift of any combinations of groups with each group comprised of four piezo-electric element pieces in response to a control signal in a manner similar to the above.

As described, the piezo-electric element pieces are set independent of each other to increase the degrees of freedom for vibration application, thereby permitting various drive methods. Also, if the vibration application is carried out in such a drive method that two piezo-electric element pieces correspond to a half-wave length, then a mode of a half period may be generated in the above embodiment. In other words, a single motor can change its properties of torque and of speed.

Figure 4:
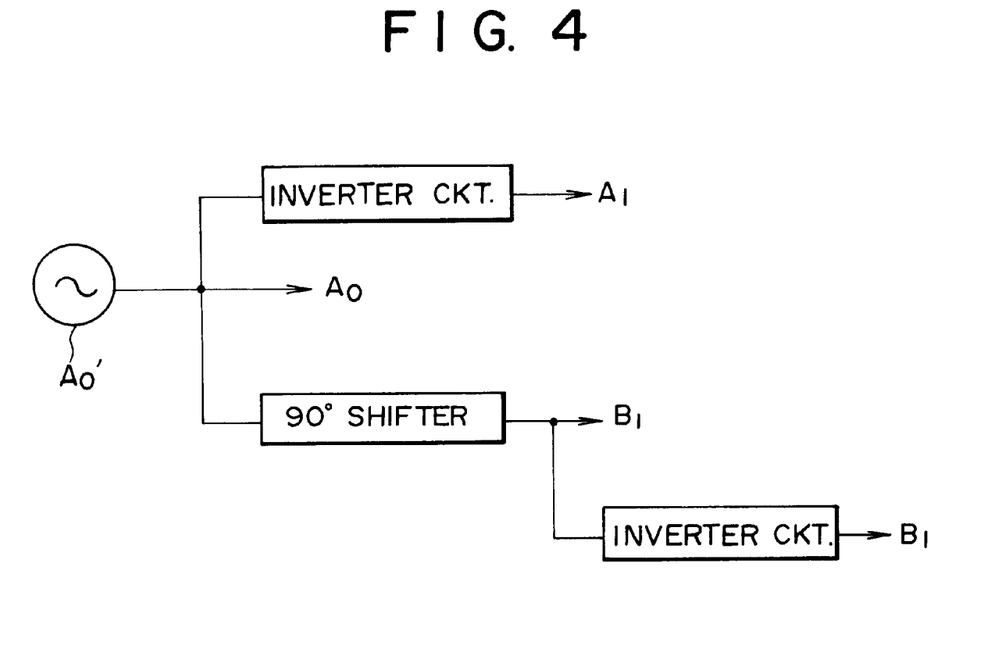

FIG. 4 shows an example of a circuit to form the signals of the A0 to B1 phases in the embodiment. In the circuit, a signal forming circuit A0' produces a signal of A0. An inverter circuit inverts a signal of A0 from the signal forming circuit A0' to obtain a signal of A1. A 90° shifter shifts the signal of A0 by 90 degrees to obtain a signal of B0. Another inverter circuit inverts a signal of B0 to form a signal of B1.

In the present invention, electrostrictive elements may be employed instead of the piezo-electric elements as electro-mechanical energy conversion elements.

What is claimed is:

1. A vibration-type motor comprising:
   vibrator means;
   an electro-mechanical energy conversion element portion disposed on said vibrator means, said conversion element portion having a plurality of conversion elements, each of said conversion elements being polarized in the same direction;
   a drive circuit for applying a first cyclic signal to a plurality of first element groups and a second cyclic signal different in phase from the first cyclic signal to a plurality of second element groups, each of said first element groups and said second element groups comprising a plurality of conversion elements of said electro-mechanical energy conversion element portion, a plurality of conversion elements in each of said first element groups and said second element groups being disposed next to each other, respectively; and
   a selection circuit arranged to variably select constituent conversion elements of said first element group and said second element group.

2. A vibration-type motor according to claim 1, wherein said drive circuit also applies a third cyclic signal different in phase from said first and second cyclic signals to a plurality of third element groups, and a fourth cyclic signal different in phase from said first, second and third cyclic signals to a plurality of fourth element groups, each of said third element groups and said fourth element groups comprising a plurality of conversion elements of the electro-mechanical energy conversion element portion, a plurality of conversion elements in each of said third element groups and said fourth element groups being disposed next to each other, respectively, and said selection circuit variably selecting the constituent conversion elements of said third element groups and said fourth element groups.

3. A vibration-type motor according to claim 2, wherein said first and second element groups are alternately disposed and wherein said third and fourth element groups are alternately disposed.

4. A vibration-type motor according to claim 3, wherein a phase difference between cyclic signals applied to said first element croup and to said second element group is 180 degrees, a phase difference between cyclic signals applied to said first element group and to said third element group is 90 degrees, and a phase difference between cyclic signals applied to said third element group and to said fourth element group is 180 degrees.

5. A vibration-type motor according to claim 1, wherein said conversion elements are consecutively disposed in a ring at an equal pitch.

6. A vibration-type motor comprising:

a vibrator;

an electromechanical energy conversion element portion disposed on said vibrator, said conversion element portion including a plurality of conversion elements, each of said plurality of conversion elements being polarized in the same direction, said conversion element portion being divided into a plurality of first element groups, a plurality of second element groups, a plurality of third element groups and a plurality of fourth element groups, each of said element groups being configured from a plurality of conversion elements that are disposed next to each other, the plurality of first element groups and the plurality of second element groups being disposed interleaved, and the plurality of third element groups and the plurality of fourth element groups, being disposed interleaved;

a selection circuit arranged to variably select constituent conversion elements of said plurality of first element groups, said plurality of second element groups, said plurality of third element groups and said plurality of fourth element groups; and a driving circuit for applying different phase cyclic signals to said plurality of first element groups, said plurality of second element groups, said plurality of third element groups and said plurality of fourth element groups respectively, wherein a phase difference between cyclic signals applied to said plurality of first element groups and said plurality of second element groups is 180 degrees, a phase difference between cyclic signals applied to said plurality of first element groups and said plurality of third element groups is 90 degrees, and a phase difference between cyclic signals applied to said plurality of third element groups and said plurality of fourth element groups is 180 degrees.

7. A vibration-type motor comprising:

a vibrator;

an electromechanical energy conversion element portion disposed on said vibrator, said conversion element portion having a plurality of conversion elements, a drive circuit for applying a first cyclic signal to a plurality of first element groups and a second cyclic signal different in phase from the first cyclic signal to a plurality of second element groups, each of said first element groups and said second element groups comprising a plurality of conversion elements of said electro-mechanical energy conversion element portion; and a selection circuit arranged to variably select arbitrary constituent conversion elements of said first element groups and said second element groups.

8. A vibration-type motor according to claim 7, wherein said drive circuit also applied a third cyclic signal different in phase from said first cyclic signal and said second cyclic signal to a plurality of third element groups, and a fourth cyclic signal different in phase from said first cyclic signal, said second cyclic signal and said third cyclic signal to a plurality of fourth element groups, each of said third element groups and said fourth element groups comprising a plurality of conversion elements of the electro-mechanical energy conversion element portion, and wherein said selection circuit variably selects arbitrary constituent conversion elements of said third element groups and said fourth element groups.

* * * * *

UNITED STATES PATENT AND TRADEMARK OFFICE
CERTIFICATE OF CORRECTION

PATENT NO. : 5,945,769

DATED : August 31, 1999

INVENTOR(S): REIJI MITARAI, ET AL.

It is certified that error appears in the above-identified patent and that said Letters Patent is hereby corrected as shown below:

Column 1

Line 35, "having" should read --have--.
Line 50, "actually." should read --in actual practice--.
Line 55, "frequency" should read --frequency,--.
Line 59, "Entended" should read --Extended--.

Column 2

Line 20, "aspects" should read --aspect--.

Column 3

Line 23, "10 vibrator," should read --vibrator 10,--.

Column 4

Line 11, "may" should read --selectively may--.

UNITED STATES PATENT AND TRADEMARK OFFICE
CERTIFICATE OF CORRECTION

PATENT NO. : 5,945,769

DATED : August 31, 1999

INVENTOR(S): REIJI MITARAI, ET AL.

It is certified that error appears in the above-identified patent and that said Letters Patent is hereby corrected as shown below:

<u>Column 5</u>

Line 8, "croup" should read --group--.
   Line 28, "configurated" should read --configured--.

<u>Sheet 1</u>

Figure 1, label "1" should read --11-- (see attached).

<u>Sheet 4</u>

Figure 4, label "$B_1$" (output of "90° SHIFTER") should read --$B_0$-- (see attached).

Signed and Sealed this

Thirtieth Day of January, 2001

Attest:

Q. TODD DICKINSON

*Attesting Officer*        *Director of Patents and Trademarks*